(12) United States Patent
Sinz et al.

(10) Patent No.: US 11,894,731 B2
(45) Date of Patent: Feb. 6, 2024

(54) MOTOR ASSEMBLY COMPRISING A POSITION SENSOR

(71) Applicant: Robert Bosch GmbH, Stuttgart (DE)

(72) Inventors: Wolfgang Sinz, Hergatz (DE); Konstantin Haberkorn, Stuttgart (DE); Patrick Budaker, Weinstadt (DE); Lothar Detels, Burgberg (DE); Marc Micke, Boennigheim (DE); Klaus Lerchenmueller, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 17/416,103

(22) PCT Filed: Dec. 12, 2019

(86) PCT No.: PCT/EP2019/084884
§ 371 (c)(1),
(2) Date: Jun. 18, 2021

(87) PCT Pub. No.: WO2020/126821
PCT Pub. Date: Jun. 25, 2020

(65) Prior Publication Data
US 2022/0085695 A1    Mar. 17, 2022

(30) Foreign Application Priority Data

Dec. 21, 2018    (DE) .................. 10 2018 222 842.6

(51) Int. Cl.
*H02K 11/21*    (2016.01)
*H02K 5/15*    (2006.01)
*H02K 5/173*    (2006.01)

(52) U.S. Cl.
CPC ............ *H02K 11/21* (2016.01); *H02K 5/15* (2013.01); *H02K 5/173* (2013.01)

(58) Field of Classification Search
CPC .......... H02K 11/21; H02K 5/15; H02K 5/173; H02K 11/225
See application file for complete search history.

(56) References Cited

U.S. PATENT DOCUMENTS

2012/0274185 A1* 11/2012 Kanemitsu ............ H02K 24/00
                                                              310/156.01
2015/0222152 A1   8/2015 Yamada et al.
2017/0288499 A1* 10/2017 Beyerl .................. H02K 7/116

FOREIGN PATENT DOCUMENTS

DE             39 14 082 A1    10/1990
DE           103 55 076 B4     3/2016
DE     10 2015 115 153 A1     3/2017
JP               S61-52146 A    3/1986
JP               S63-15758 A    1/1988
(Continued)

OTHER PUBLICATIONS

JP-2001128414-A_translate (Year: 2001).*
(Continued)

*Primary Examiner* — Tulsidas C Patel
*Assistant Examiner* — Mohammed Ahmed Qureshi
(74) *Attorney, Agent, or Firm* — Maginot, Moore & Beck LLP

(57) ABSTRACT

A motor assembly includes a rotor and a sensor arrangement. The sensor arrangement has a sensor and a target. The target is applied to a surface of the rotor and the sensor is mounted on a bearing shield of the motor opposite the target.

20 Claims, 3 Drawing Sheets

(56) References Cited

FOREIGN PATENT DOCUMENTS

| JP | H7-93875 A |   | 4/1995 |
|----|------------|---|--------|
| JP | 3042636 U  |   | 10/1997 |
| JP | 2001128414 A | * | 5/2001 |
| JP | 2007-282403 A |   | 10/2007 |

OTHER PUBLICATIONS

International Search Report corresponding to PCT Application No. PCT/EP2019/084884, dated Mar. 17, 2020 (German and English language document) (5 pages).

* cited by examiner

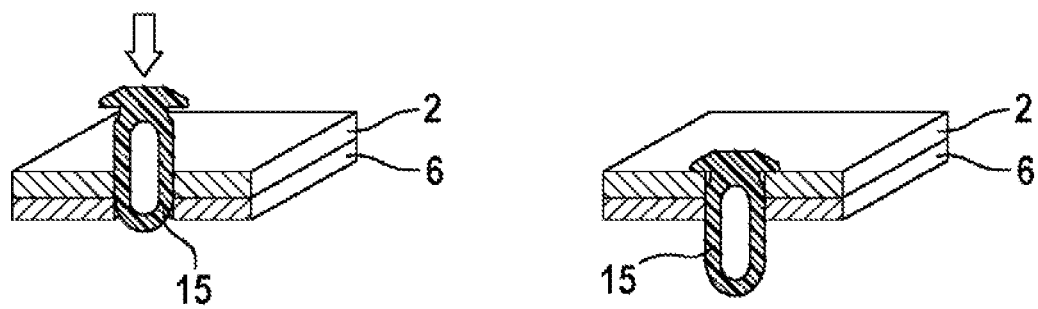
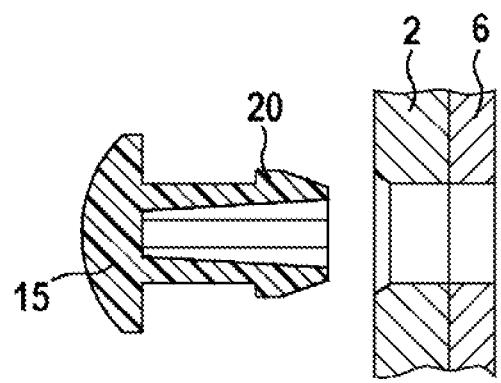
Fig. 5
Fig. 6
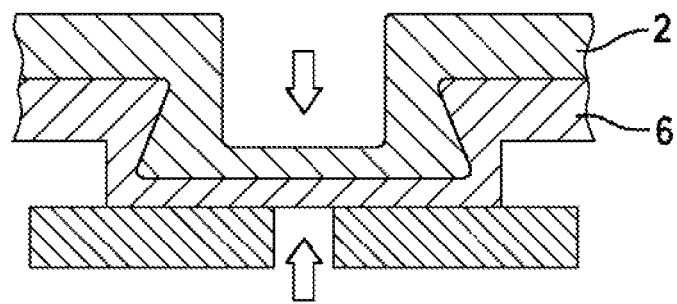
Fig. 7

MOTOR ASSEMBLY COMPRISING A POSITION SENSOR

This application is a 35 U.S.C. § 371 National Stage Application of PCT/EP2019/084884, filed on Dec. 12, 2019, which claims the benefit of priority to Serial No. DE 10 2018 222 842.6, filed on Dec. 21, 2018 in Germany, the disclosures of which are incorporated herein by reference in their entirety.

BACKGROUND

Laid-open specification DE 3914082 A1 discloses an electronically commutated electric motor with a stator having at least one stator winding, rotor having magnetized regions, and a sensor element on the stator for detecting the position of the magnetized regions.

SUMMARY

The disclosure relates to a motor assembly having a rotor and a sensor arrangement. The sensor arrangement comprises a sensor and a target, wherein the target is mounted on a surface of the rotor and wherein the sensor is mounted opposite the target on a bearing bracket of the motor.

This has the advantage that the motor is very compact in construction. A bearing bracket which serves for the mounting of the rotor shaft of the motor is additionally used for the mounting of the sensor. In this manner, installation space which is otherwise unused is saved and the components used to determine the rotor position are arranged in a compact manner inside the motor.

In an embodiment of the motor assembly, the sensor is mounted on the bearing bracket by means of an insulating disk. By means of the insulating disk it is ensured that, in the case of a metal bearing bracket, no interference occurs between the electronics of the sensor and the bearing bracket. The insulating disk further provides mechanical coupling in the sense of fixing to the bearing bracket.

In a further embodiment of the motor assembly, the sensor and the insulating disk engage around a rotor shaft of the rotor. A bearing of the rotor shaft is thereby arranged radially between the rotor shaft on the one hand and the sensor and the insulating disk on the other hand. In particular, an axial portion of the bearing bracket which extends in the axial direction of the motor is thereby provided between the sensor and the insulating disk on the one hand and the bearing on the other hand. This arrangement of the components around the rotor shaft has the advantage that components are mounted in a space-saving manner.

In an advantageous embodiment of the motor assembly, the axial portion of the bearing bracket is funnel-shaped and fixes the bearing. In this manner, the bearing is displaceable close in the direction of the rotor and can be arranged in a space-saving manner. By positioning the bearing close in the direction of the rotor, the overall length of the motor is shortened.

Furthermore, in the motor assembly, the sensor can be stationarily received with the insulating disk in a cavity of the motor assembly. The cavity is delimited at least partially by the bearing bracket, the rotor and by an insulating body of the stator windings of the stator. The motor provided has structurally a corresponding cavity. Owing to the fact that the sensor principle used is very flat in construction, by introducing the sensor and the insulating disk into the cavity the cavity can be used and does not remain unused. As a result, the motor as a whole can be designed to be smaller in relation to its total volume. Stationary mounting on the bearing bracket has the advantage that the sensor is thus mounted on a stable component in the motor compartment, and a reliable zero point is accordingly ensured by the sensor positioning and fixing.

In a further embodiment of the motor assembly, the target is mounted on a surface of the rotor facing the cavity and is rotatable, in particular rotatable together with the rotor, in the cavity relative to the sensor.

In an embodiment of the motor assembly, the target is connected to the rotor by means of a connecting means, wherein the connecting means is in particular a rivet, a clip, a hook, an ultrasonic riveting point or a clinch point. By means of the fixed connection between the target and the rotor it is possible to prevent an offset from occurring between the rotor and the target, which can lead to falsification of the measurement results in the case of rotational movements which the rotor performs.

In an advantageous embodiment, the target and the sensor are annular in form and have a central opening. The outside radius of the target is thereby smaller than or equal to the outside radius of the sensor, and the inside radius of the target is larger than or equal to the inside radius of the sensor. In this manner, good coverage of the sensor surface with the target surface can be ensured, whereby a sufficiently good measuring signal is generated, in particular because the measurement in the case of an inductive measuring principle is dependent on the degree of coverage or degree of overlap of the sensor and the target.

BRIEF DESCRIPTION OF THE DRAWINGS

An embodiment of the disclosure will be described hereinbelow with reference to figures.

FIGS. 4-7 show alternative approaches for the fastening of a target to a rotor of the motor.

DETAILED DESCRIPTION

Figure 1:
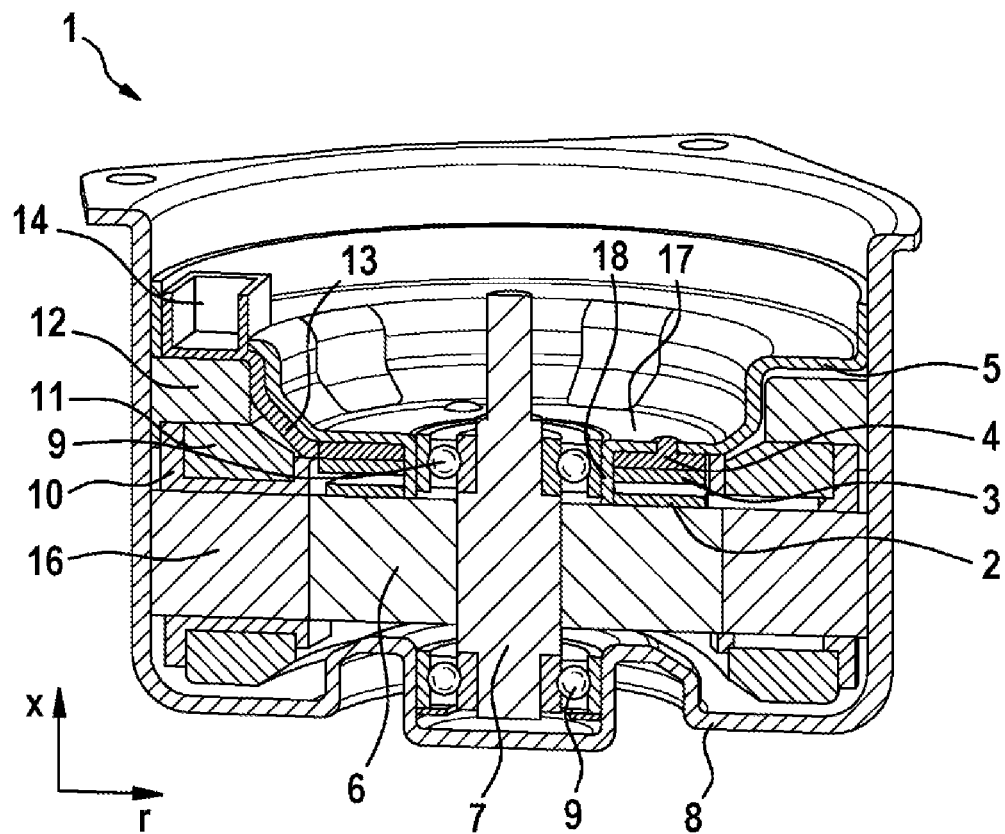
FIG. 1 is a first view of a motor assembly comprising a position sensor.

FIG. 1 shows a motor assembly 1. The motor assembly 1 comprises a motor housing 8 and a bearing bracket 5. Two ball bearings 9, which support a rotor shaft 7, are supported on the one hand on the bearing bracket 5 and on the other hand on the motor housing 8. In other words, the ball bearings 9 are held, in particular fixed, by the bearing bracket 5 and the motor housing 8. The rotor shaft 7 carries a rotor 6. The rotor 6 is connected to the rotor shaft 7 such that, it is able to perform a rotational movement about the longitudinal axis of the rotor shaft 7 together with the rotor shaft 7. The longitudinal axis of the rotor shaft 7 extends from the motor housing 8 to the bearing bracket 5, denoted by the direction x.

The rotor 6 is surrounded by a corresponding stator 16, which has corresponding stator windings 11. Mounted on the rotor 6 is a target 2. The target 2 is mounted on an upper side of the rotor 6 which faces the bearing bracket 5. The target 2 is part of a sensor arrangement which comprises, in addition to the target 2, a sensor 3. The sensor 3 is connected to the bearing bracket 5 via an insulating disk 4. The insulating disk insulates the electronics of the sensor 3 in the direction of the bearing bracket 5 and permits fastening.

The target 2, the sensor 3 and the insulating disk 4 are provided in annular form, in particular in the form of disks. Circular openings are present in the middle of each of the target 2, the sensor 3 and the insulating disk 4. The circular openings are of such a size that the rotor shaft 7, the bearing 9 and the axial portion 18 can be received therein.

The target 2 with its circular opening has an inside radius which is larger than or equal to the inside radius of the sensor 3 with its circular opening, and an outside radius which is smaller than or equal to the outside radius of the sensor 3.

The sensor and the target 2 here operate by an inductive measurement principle, wherein the sensor comprises an excitation winding and a detector winding. The target comprises regions that are electrically conductive as well as electrically non-conductive regions. As the target 2 rotates, the electrically conductive regions of the target 2, in alternation with the non-conducting regions of the target 2, pass over the sensitive surfaces of the sensor 3. A variable voltage is thereby induced in the detector winding, which as a signal characterizes the rotational movement. The position of the rotor relative to the stator can thereby be determined.

A portion of the bearing bracket 5 and also the upper hall bearing 9 project into the circular openings of the sensor 3 and of the insulating disk 4. The bearing bracket 5 has in the central portion, which tapers towards the rotor shaft 7, a radial region 17 and an axial region 18. The radial region 17 has an extent orthogonal to the direction x in FIG. 1, indicated by the direction r. The axial region 18 extends adjoining the radial region 17 in the direction x parallel to the rotor shaft 7 in the direction of the motor housing 8. The axial region 18 of the bearing bracket 5 forms a funnel in which the ball bearing 9 is mounted. The axial region 18 and the ball bearing 9 are received in the circular opening of the sensor 3 and of the insulating disk 4.

The lower ends of the ball bearing 9 and of the axial portion 18 of the bearing bracket 5 can either be flush with the lower side of the sensor 3 or alternatively protrude beyond the opening of the insulating plate 4 and the sensor 3. In this case, the axial region 18 and the hall bearing 9 can also be partially received in the circular opening of the target 2.

By means of the sensor arrangement, consisting of the target 2 and the sensor 3, a rotor position of the rotor 6 can be determined. A relative displacement in the form of a rotational movement of the target 2 relative to the sensor 3 leads to a characteristic signal, which can be allocated to a rotor position.

The target 2 is fixedly connected to the rotor 6. The sensor 3 is connected via the insulated disk to the bearing bracket 5. Since the rotor 6 rotates in operation, in particular with the rotor shaft 7, the target 2 fixedly connected to the rotor 6 rotates. The rotation of the target 2 relative to the sensor 3 stationarily connected to the bearing bracket 5 is measured by means of the sensor 3.

In order to tap the sensor signal, the sensor 3 is connected by means of a contacting element 13 to a socket 14. There can be connected to the sensor 2, for example, a cable 13 which is connected to the socket 14. The socket 14 can then be connected to a control device. A direct connection of the sensor 2 to a control device is of course also conceivable, whereby the socket 14 is then omitted.

Figure 2:
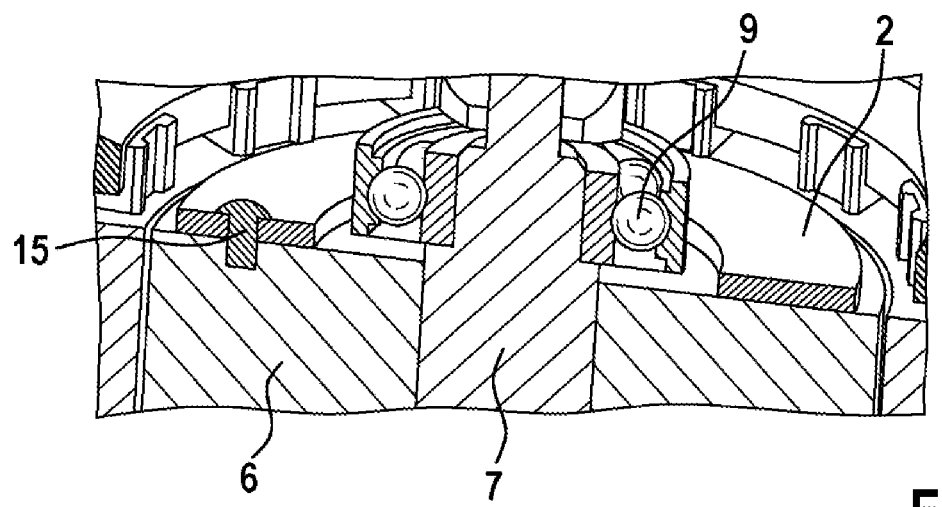
FIG. 2 is a second view of a motor assembly comprising of a position sensor.

It is shown in FIG. 2 how the target 2 extends around the rotor shaft 7, wherein the figure is a sectional view in which the bearing bracket 5 is not shown. The target 2 is connected to the rotor 6 via a fastening means 15. A fixed connection between the target 2 and the rotor 6 has the result that no offset can occur between the rotor 6 and the target 2, which can impair the quality of the measurement. In FIG. 2, the connection between the target 2 and the rotor 6 is a rivet connection. For this purpose, the target 2 is fastened to the rotor 6 by means of a rivet 15. A connection with multiple rivets is of course also possible.

Figure 3:
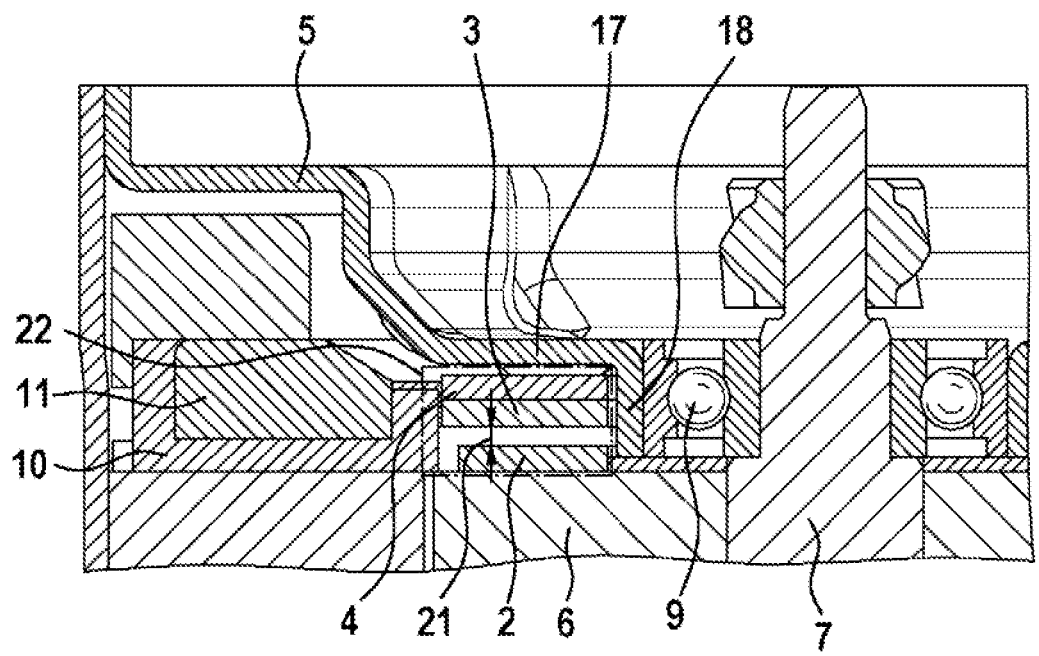
FIG. 3 is a third view of a motor assembly comprising a position sensor.

FIG. 3 shows in greater detail how the target 2, the sensor 3 and the insulating disk 4 are arranged in relation to the bearing bracket 5 and the bearing 9 and also the rotor shaft 7. The target 2 and the sensor 3, which are arranged substantially in parallel, are arranged offset relative to one another by a distance 21. This distance is to be provided such that the measurement by means of an inductive measuring method functions reliably.

The target 2, the sensor 3 and the insulating disk 4 are all arranged concentrically around the rotor shaft 7 and engage around the rotor shaft. As has already been said, the sensor 3 and the insulating disk 4 also engage around the lower portion 18 of the bearing bracket 5 and the bearing 9 which is there mounted in the bearing bracket 5.

Depending on the length of the portion 18 and of the bearing 9 in the x-direction, they may also protrude in the x-direction into the central opening of the target 2, as already described with reference to FIG. 1. It is likewise conceivable that the portion 18 and the bearing do not extend in the x-direction into the central opening of the target 2. The axial portion 18 of the bearing bracket 5 and the bearing 9 must not touch the rotor 6 in order that it is able to rotate freely relative to the bearing bracket 5 and the bearing 9.

The sensor 3 is connected to the insulating disk 4. The insulating disk 4 is in turn fastened to the radial portion 17 of the bearing bracket 5. This fastening can take place via hot press-fitting, likewise conceivable are press-fitting techniques or snap or rivet connections.

The sensor 3, the target 2 and the insulating disk 4 are provided in the form of a stack, wherein the sensor 3 and the insulating disk 4 are mounted stationarily on the bearing bracket 5 and the target 2 is provided so as to rotate with the rotor 6 and wherein the air gap 21 is provided between the sensor 3 and the target 2. The sensor 3, the target 2 and the insulating disk 4 are received in a cavity 22 between the hearing bracket 5, the rotor 6 and an insulating body 10 of the stator windings 11.

Figure 4:
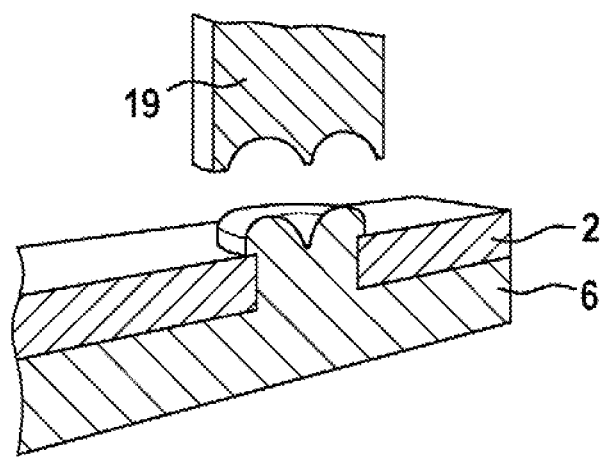

Alternative possibilities for fastening the target 2 to the rotor 6 are the subject of FIGS. 4-7. FIG. 4 shows ultrasonic rivet joint, in which the target 2 is connected to the rotor 6 by ultrasonic riveting protruding portion of the rotor 6, which extends through the target 2, is thereby deformed by an energy input by means of an ultrasonic die, which results in a positive connection between the target 2 and the rotor 6. The wavy shape of the die is here to be understood by way of example.

FIGS. 5 and 6 snow snap connections, in which a connection between the target 2 and the rotor 6 is achieved by differently shaped connecting elements 15. To this end, the connecting element 15, with the application of force thereto, is pressed into an opening which is formed in part by the target 2 and in part by the rotor 6. In a mounted end position of the connecting element 15, the connecting element deforms so that it locks or catches (FIG. 5), or it is held by positive engagement or friction. Possible connecting elements 15 are hooks, spheres, clasps, clips. Further forms are possible. FIG. 5 shows in the left-hand part a plug which is pressed into the common opening formed by the target 2 and the rotor 6. It is held there by force-based engagement, as is shown in the right-hand part of FIG. 5.

In FIG. 6, the connecting element 15 has latching projections 20 on the sides, which yield in terms of their position as they are inserted. As soon as the connecting element 15 is in the end position, the latching projections engage behind corresponding elements in/on the rotor 6, which results in fixing of the rotor 6 and the target 2 to one another.

FIG. 7 shows a connecting method in which the rotor 6 and the target 2 are connected together by clinching by deformation of material. To this end, a force input in the direction indicated by the arrows must be introduced on connection.

The invention claimed is:

1. A motor assembly, comprising:
   a rotor including a rotor shaft defining an axis;
   a bearing bracket; and
   a sensor arrangement having a sensor and a target,
   wherein
      the target is mounted on a surface of the rotor,
      the sensor is mounted opposite the target on the bearing bracket, and
      the bearing bracket is configured to support a bearing such that the bearing is positioned between at least a portion of the sensor assembly and the rotor in a direction orthogonal to the axis.

2. The motor assembly as claimed in claim 1, further comprising an insulating disk,
   wherein the sensor is mounted on the bearing bracket by way of the insulating disk.

3. The motor assembly as claimed in claim 2, wherein:
   the motor assembly includes the bearing,
   the sensor and the insulating disk engage around the rotor shaft, and
   the bearing is arranged radially, with respect to the axis, between (i) the rotor shaft, and (ii) the sensor and the insulating disk.

4. The motor assembly as claimed in claim 3, wherein:
   the sensor is stationarily received with the insulating disk in a cavity of the motor assembly, and
   the cavity is delimited at least partially by the bearing bracket, the rotor and an insulating body of the stator windings of the stator.

5. The motor assembly as claimed in claim 4, wherein the target is mounted on a surface of the rotor facing the cavity and is rotatable in the cavity relative to the sensor.

6. The motor assembly as claimed in claim 5, wherein the target is rotatable with the rotor in the cavity relative to the sensor.

7. The motor assembly as claimed in claim 3, wherein an axial portion of the bearing bracket extends between (i) the sensor and the insulating disk, and (ii) the bearing.

8. The motor assembly as claimed in claim 7, wherein the axial portion of the bearing bracket is funnel-shaped and fixes the bearing.

9. The motor assembly as claimed in claim 7, wherein:
   the bearing bracket is configured to be positioned within a motor housing and to support the bearing within the motor housing.

10. The motor assembly as claimed in claim 7, wherein at least a portion of the axial portion of the bearing bracket is directly radially inwardly of the target.

11. The motor assembly as claimed in claim 1, wherein the target is connected to the rotor.

12. The motor assembly as claimed in claim 11, wherein the target is connected to the rotor by one of a rivet, a clip, a hook, an ultrasonic riveting point, and a clinch point.

13. The motor assembly as claimed in claim 1, wherein:
   the target and the sensor are annular in form and have a central opening,
   the outside radius of the target is smaller than or equal to an outside radius of the sensor, and
   the inside radius of the target is larger than or equal to an inside radius of the sensor.

14. The motor assembly as claimed in claim 1, wherein the bearing bracket is configured to be entirely located radially outwardly of the bearing.

15. A motor assembly, comprising:
   a rotor;
   a bearing bracket; and
   a sensor arrangement having a sensor and a target,
   wherein
      the target is mounted on a surface of the rotor,
      the sensor is mounted opposite the target on the bearing bracket, and
      an axially extending portion of the bearing bracket supports a bearing and is located between at least a portion of the sensor assembly and the bearing.

16. The motor assembly as claimed in claim 15, wherein the bearing bracket is located entirely radially outwardly of the bearing.

17. A motor assembly, comprising:
   a rotor;
   a bearing bracket; and
   a sensor arrangement having a sensor and a target,
   wherein
      the target is mounted on a surface of the rotor,
      the sensor is mounted opposite the target on the bearing bracket,
      the target and sensor are ring-shaped and have a central opening, and
      either (i) an outer radius of the target is smaller than an outer radius of the sensor, and an inner radius of the target is greater than or equal to an inner radius of the sensor, or (ii) the outer radius of the target is equal to the outer radius of the sensor and the inner radius of the target is greater than the inner radius of the sensor.

18. The motor assembly as claimed in claim 17, wherein:
   the bearing bracket includes a radially extending portion;
   the sensor is mounted to the radially extending portion; and
   the bearing bracket includes an axially extending portion which extends directly from the radially extending portion along an inner side of the sensor.

19. The motor assembly as claimed in claim 18, wherein:
   the motor assembly includes a first bearing; and
   the axially extending portion extends along an outer side of an outer race of the first bearing.

20. The motor assembly as claimed in claim 19, further comprising:
   a motor housing supporting the bearing bracket; and
   a second bearing directly supported by the motor housing.

* * * * *